Sept. 30, 1952     G. LEHMANN     2,612,330
DEVICE FOR OPERATING CONTROL SURFACES, ESPECIALLY FOR AIRCRAFT
Filed Feb. 15, 1949
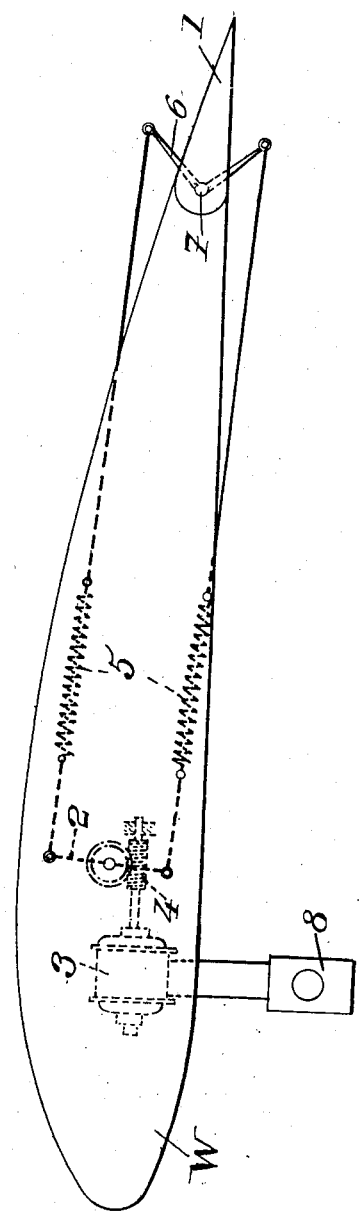
INVENTOR
GERARD LEHMANN,
BY
ATTORNEY Patented Sept. 30, 1952

2,612,330

UNITED STATES PATENT OFFICE 2,612,330

DEVICE FOR OPERATING CONTROL SURFACES, ESPECIALLY FOR AIRCRAFT

Gerard Lehmann, Paris, France, assignor to Office National d'Etudes et de Recherches Aeronautiques (O. N. E. R. A.), Paris, France, a society of France Application February 15, 1949, Serial No. 76,536
In France February 27, 1948

3 Claims. (Cl. 244—75)

The present invention relates to devices for operating control surfaces pivotally mounted on bodies movable in a fluid and it is more especially but not exclusively, concerned, among these devices, with those provided on aircraft for operating steering, elevator, aileron or other control surfaces.

Its chief object is to provide a device of this kind which is better adapted to meet the requirements of practice than those used up to this time.

A preferred embodiment of my invention will be hereinafter described with reference to the accompanying drawings, given merely by way of example and in which:

The only figure is a diagrammatical view showing a device for operating aircraft control surfaces made according to my invention.

In the following description, it will be supposed that the invention is applied to the case of a device for operating an aircraft control surface 1 (for instance an aileron pivoted to a wing W) so as imperatively to determine, not the angle at which said control member is turned, but the value of the torque applied to this control member.

The principle which consists in operating an aircraft control surface by applying a constant torque thereto, without imperatively imposing thereto a given angle of rotation, is intended to enable the aircraft to react always substantially in the same manner to the operation of said control surface whatever be the speed of said aircraft.

This is obviously desirable because this control surface will automatically assume a position of equilibrium depending upon the torque thus applied thereto and the aerodynamic pressure to which it is subjected. In particular, the higher this aerodynamic pressure, the more the control member will tend to retract, the attitude correcting torque imparted to the aircraft by the operation of said control surface remaining substantially constant.

It has already been proposed, in order to obtain a constant torque, to make use of an electric telecontrol of the torque-motor type (i. e. a motor exerting a constant torque).

This solution had, in addition to the volume and weight disadvantages inherent in torquemotors, that of requiring consumption of current during the whole time of the evolution produced by the operation of the control surface.

In order to obviate these drawbacks, the device according to my invention for producing the torque applied to control surface 1 is made as follows:

A double lever bar 2 is pivoted to the aircraft about its middle point and is positively actuated by telecontrol means including an ordinary electric motor 3 which permits of imparting to said bar a rotation of predetermined amplitude, motor 3 being connected with bar 2 through irreversible operating means, for instance an endless screw 4.

Between this bar 2 and control surface 1, an elastic transmission is provided which enables said control surface to assume a position of equilibrium under the combined action of the aerodynamic pressure applied thereto and of the torque due to the rotary displacement of bar 2.

For this purpose and by way of example, said elastic transmission may be constituted by two springs 5 which connect respectively the ends of the bar 2 with the ends of a lever 6 to which control surface 1 is fixed so as to pivot together therewith about the axis thereof.

It will be understood that electric motor 3, preferably of light weight and running at high speed, operated through means 8, either automatic or actuated by the pilot, of any suitable usual type, for instance of the potentiometer type, imperatively determines the angular position assumed by intermediate bar 2.

With such operating means, once said intermediate bar has been brought into the desired angular position, electric motor 3 stops and current is no longer consumed.

It should be noted that, if no special precaution is taken, the torque transmitted to control surface 1 will vary according to the angular position actually assumed by said control member.

This variation can be considerably reduced and this torque can even be made substantially independent of the amplitude of the displacement undergone by control member 1 by having recourse, for establishing lever 6 and springs 5, to a feature of my invention independent of the preceding one, that is to say which can be applied even if the intermediate equalizer bar 2 is controlled directly by the pilot (by hand or by foot) without the intervention of a servomotor.

According to this feature, the elastic means constituted by springs 5 are arranged to cooperate with lever 6 in such manner that the tension of each of these springs and the lever arm of the force it represents vary inversely when control surface 1 is pivoted.

According to a preferred embodiment illustrated by the drawing, I give lever 6 the shape of a bent lever such that its branches make an angle of about 90° with each other, and springs 5 are so chosen that, when lever 6 has rotated through 45° from its mean position, that is to say when one of its branches is at right angles to the neutral position of control member 1, the stretching of the corresponding spring 5 is substantially zero.

In these conditions, the torque transmitted to control member 1 is substantially independent of the angle of rotation thereof, which makes it possible substantially to reduce the power of electric motor 3.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft structure, in combination, an aircraft control surface pivotally mounted on said aircraft structure and extending toward the rear of its pivot axis, a bent lever having its two branches equal to each other and substantially at right angles to each other, the apex of the angle made by these two branches being at the front of said lever, said lever being rigid with said control surface so that said surface is located in the bisector plane of the angle made by said two branches, two flexible connections including identical springs respectively having respective ends thereof secured to the ends of said branches and extending therefrom in a general direction substantially paralled but opposed to that in which said control surface in its neutral position extends from its pivot axis and means on said aircraft structure for imparting to the other ends of said flexible connections simultaneous displacements of equal amplitudes and opposed directions said springs being so chosen that, when said lever is at 45° to its neutral position, the spring connected to one lever branch perpendicular to the neutral direction of said control surface is not stretched.

2. A device according to claim 1 in which the last mentioned means include a lever pivoted to said aircraft structure at its middle point and to the ends of which are secured the other ends of said flexible connections respectively, an electric motor of conventional type, and irreversible transmission means between said motor and said last mentioned lever for causing said lever to be rotated in response to the running of said motor.

3. In an aircraft structure, in combination, an aircraft control surface pivotally mounted on said aircraft structure and extending toward the rear of its pivot axis, a bent lever having its two branches equal to each other and making an angle smaller than 180° with each other, the apex of the angle made by these two branches being at the front of said lever, said lever being rigid with said control surface so that said surface is located in the bisector plane of the angle made by said branches, two flexible connections including identical springs respectively having respective ends thereof secured to the ends of said branches and extending therefrom in a general direction substantially parallel but opposed to that in which said control surface in its neutral position extends from its pivot axis, and means on said aircraft structure for imparting to the other ends of said flexible connections simultaneous displacements of equal amplitudes and opposed directions.

GERARD LEHMANN.

REFERENCES CITED

The following references are of record in the file of this patent:

UNITED STATES PATENTS

| Number | Name | Date |
|---|---|---|
| 1,798,914 | Thurston | Mar. 31, 1931 |
| 1,902,802 | Hobbs | Mar. 21, 1933 |
| 1,914,000 | Tower | June 13, 1933 |
| 2,254,473 | DeBell | Sept. 2, 1941 |
| 2,277,378 | Wells | Mar. 24, 1942 |
| 2,379,999 | Tydon | July 10, 1945 |